(12) United States Patent
Malhotra (10) Patent No.: US 12,035,424 B2
(45) Date of Patent: Jul. 9, 2024

(54) WIRELESS COMMUNICATION TECHNIQUES USING RADIATION SHIELDING STRUCTURE IN COMMERCIAL PASSENGER VEHICLES

(71) Applicant: Panasonic Avionics Corporation, Lake Forest, CA (US)

(72) Inventor: Jaideep Malhotra, Lake Forest, CA (US)

(73) Assignee: PANASONIC AVIONICS CORPORATION, Irvine, CA (US)

( * ) Notice: Subject to any disclaimer, the term of this patent is extended or adjusted under 35 U.S.C. 154(b) by 247 days.

(21) Appl. No.: 17/522,458

(22) Filed: Nov. 9, 2021

(65) Prior Publication Data
US 2023/0146142 A1 May 11, 2023

(51) Int. Cl.
*H04W 88/08* (2009.01)
*H01Q 1/28* (2006.01)
(Continued)

(52) U.S. Cl.
CPC ............ *H04W 88/085* (2013.01); *H01Q 1/28* (2013.01); *H01Q 1/526* (2013.01); *H04W 72/0453* (2013.01); *H04W 76/10* (2018.02)

(58) Field of Classification Search
CPC ........... H04W 88/085; H04W 72/0453; H04W 76/10; H04W 72/04; H04W 4/42;
(Continued)

(56) References Cited

U.S. PATENT DOCUMENTS

| 7,565,143 | B2 * | 7/2009 | Takeuchi | H04W 16/18 |
| | | | | 455/431 |
| 7,620,364 | B2 * | 11/2009 | Higashida | H04B 7/18508 |
| | | | | 455/66.1 |

(Continued)

FOREIGN PATENT DOCUMENTS

| CA | 3074959 A1 * | 9/2020 | ........ B61L 15/0027 |
| EP | 2632208 B1 | 5/2018 | |
| WO | 2020140983 A1 | 7/2020 | |

OTHER PUBLICATIONS

International Search Report and Written Opinion from International Application No. PCT/US2022/079531 dated Mar. 22, 2023 (14 pages).

(Continued)

*Primary Examiner* — Yu-Wen Chang
(74) *Attorney, Agent, or Firm* — Perkins Coie LLP (57) ABSTRACT

This patent document describes techniques related to providing a method for providing a wireless access zone to passengers on a commercial passenger. In one aspect, the method comprises: configuring a number of wireless access zones in the commercial passenger vehicle by distributing radio frequency (RF) shielding structures in the commercial passenger vehicle, the RF shielding structures configured to attenuate a radio signal originating in an RF band from one wireless access zone to be below a threshold prior to reaching other wireless access zones; receiving a request, from an electronic device on the commercial passenger vehicle, to connect the electronic device to a communication network; and establishing a connection of the electronic device to the communication network through radio signals in a corresponding wireless access zone.

20 Claims, 8 Drawing Sheets

(51) Int. Cl.
*H01Q 1/52* (2006.01)
*H04W 72/0453* (2023.01)
*H04W 76/10* (2018.01)

(58) Field of Classification Search
CPC ...... H04W 84/005; H04W 84/12; H01Q 1/28; H01Q 1/526; H04B 7/18506
See application file for complete search history.

(56) References Cited

U.S. PATENT DOCUMENTS

| | | |
|---|---|---|
| 2004/0098745 A1 | 5/2004 | Marston et al. |
| 2005/0170783 A1 | 8/2005 | Krishnan et al. |
| 2009/0052386 A1* | 2/2009 | Higashida ............ H04H 20/62 370/329 |
| 2010/0216457 A1* | 8/2010 | Ezaki .................. H04W 88/08 455/431 |
| 2010/0231451 A1 | 9/2010 | Noguchi et al. |
| 2011/0128949 A1* | 6/2011 | Ezaki ................ H04B 7/18506 370/338 |
| 2011/0244890 A1 | 10/2011 | Lehmann et al. |
| 2014/0013365 A1 | 1/2014 | Ezaki et al. |
| 2014/0372775 A1 | 12/2014 | Li et al. |
| 2016/0004876 A1 | 1/2016 | Bye et al. |
| 2016/0095045 A1* | 3/2016 | Salomon ................ H04W 4/40 455/411 |
| 2019/0052294 A1 | 2/2019 | Abdelmonem |
| 2019/0098478 A1 | 3/2019 | Rabii et al. |
| 2019/0149611 A1 | 5/2019 | Mueller et al. |
| 2019/0253980 A1 | 8/2019 | Rabii et al. |
| 2019/0266479 A1 | 8/2019 | Singh et al. |
| 2019/0297585 A1 | 9/2019 | Barnes et al. |
| 2020/0339266 A1 | 10/2020 | McMillan |
| 2021/0075521 A1 | 3/2021 | Bolotski et al. |

OTHER PUBLICATIONS

Extended European Search Report from European Patent Application No. 23156789.2 dated Jun. 20, 2023 (11 pages).
International Search Report and Written Opinion from International Application No. PCT/US2022/079529 dated Mar. 3, 2023 (13 pages).

* cited by examiner

WIRELESS COMMUNICATION TECHNIQUES USING RADIATION SHIELDING STRUCTURE IN COMMERCIAL PASSENGER VEHICLES

CROSS REFERENCE TO RELATED APPLICATIONS

The present patent document is related to U.S. patent application Ser. No. 17/522,544, entitled "TRANSMISSION POWER CONTROL FOR ELECTRONIC DEVICES IN COMMERCIAL PASSENGER VEHICLES," filed on Nov. 9, 2021. The aforementioned Patent Application is incorporated by reference herein in its entirety.

TECHNICAL FIELD

This document is generally related to systems, methods, and apparatus to improve passenger experiences during a travel in a commercial passenger vehicle such as airplanes, passenger train buses, cruise ships, and others.

BACKGROUND

Commercial travel has evolved with the increasing popularity of personal electronic devices (PED) that passengers carry on and media play devices provided in commercial passenger vehicles. Passenger experiences for travels sometime rely on wireless connections provided during travel in commercial passenger vehicles. Thus, systems in commercial passenger vehicles can be designed to provide passengers with a positive travel experience by improving wireless connections.

SUMMARY

This patent document describes exemplary systems, methods, and apparatus to improve passenger experiences by providing better qualities of wireless connectivity in commercial passenger vehicles. Various implementations of the disclosed technology are related to providing wireless access zones that have reduced signal interferences and improved separation from one another.

In one aspect, a method of providing a wireless access zone to passengers on a commercial passenger vehicle is provided. The method provides configuring a number of wireless access zones in the commercial passenger vehicle by distributing radio frequency (RF) shielding structures in the commercial passenger vehicle, the RF shielding structures configured to attenuate a radio signal originating in an RF band from one wireless access zone to be below a threshold prior to reaching other wireless access zones; receiving a request, from an electronic device on the commercial passenger vehicle, to connect the electronic device to a communication network; and establishing a connection of the electronic device to the communication network through radio signals in a corresponding wireless access zone.

In another aspect, an in-vehicle communication system for providing a wireless access zone to passengers on a commercial passenger vehicle is provided. The in-vehicle communication system includes a wireless access point installed in the commercial passenger vehicle and transmitting radio signals that support a wireless connection for electronic devices associated with passengers in the commercial passenger vehicle; and radio frequency (RF) shielding structures disposed in the commercial passenger vehicle and configured to allow first radio signals to be present in a wireless access zone and block second radio signals in the wireless access zone based on locations of the RF shielding structures.

In another exemplary aspect, a radio frequency communication system is provided to comprise: radio frequency (RF) shielding structures disposed in a commercial passenger vehicle; and a number of RF zones formed by a presence of the RF shielding structures, wherein the RF shielding structures are configured such that an RF signal originating in an RF band from one RF zone is attenuated below a threshold prior to reaching other RF zones, thereby providing RF isolation among the RF zones.

In yet another exemplary aspect, the above-described methods are embodied in the form of processor-executable code and stored in a non-transitory computer-readable program medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Recent advances in wireless technologies have made wireless connection services such as on-board Wi-Fi or Bluetooth connections available during travel in a commercial passenger vehicle such as an airplane or train. Unlike the past when a passenger was not provided with wireless connection services onboard during travel, onboard wireless connection services are available in many commercial vehicles so that passengers can share their trips on social media and business travelers can use their flight time more productively. While the commercial passenger vehicle is provided with limited resources to support wireless connectivity for the passengers, as more passengers use wireless connection services in the commercial passenger vehicle, undesired circumstances, for example, unsuccessful connection issues and poor signal qualities, can be caused. Such undesired circumstances can negatively affect passenger experiences for the travel and thus there have been efforts to reduce or avoid the undesired connectivity issues.

The technical solutions described in the present document can be embodied in implementations to improve a passenger experience among other features by improving wireless connectivity within the commercial passenger vehicle. Some implementations of the disclosed technology suggest improving RF channel separation and creating localized wireless zones. With various examples of the disclosed technology, it is possible to provide a more reliable connectivity to a passenger during travel, which can increase passenger experience while they stay in the vehicle.

Figure 1:
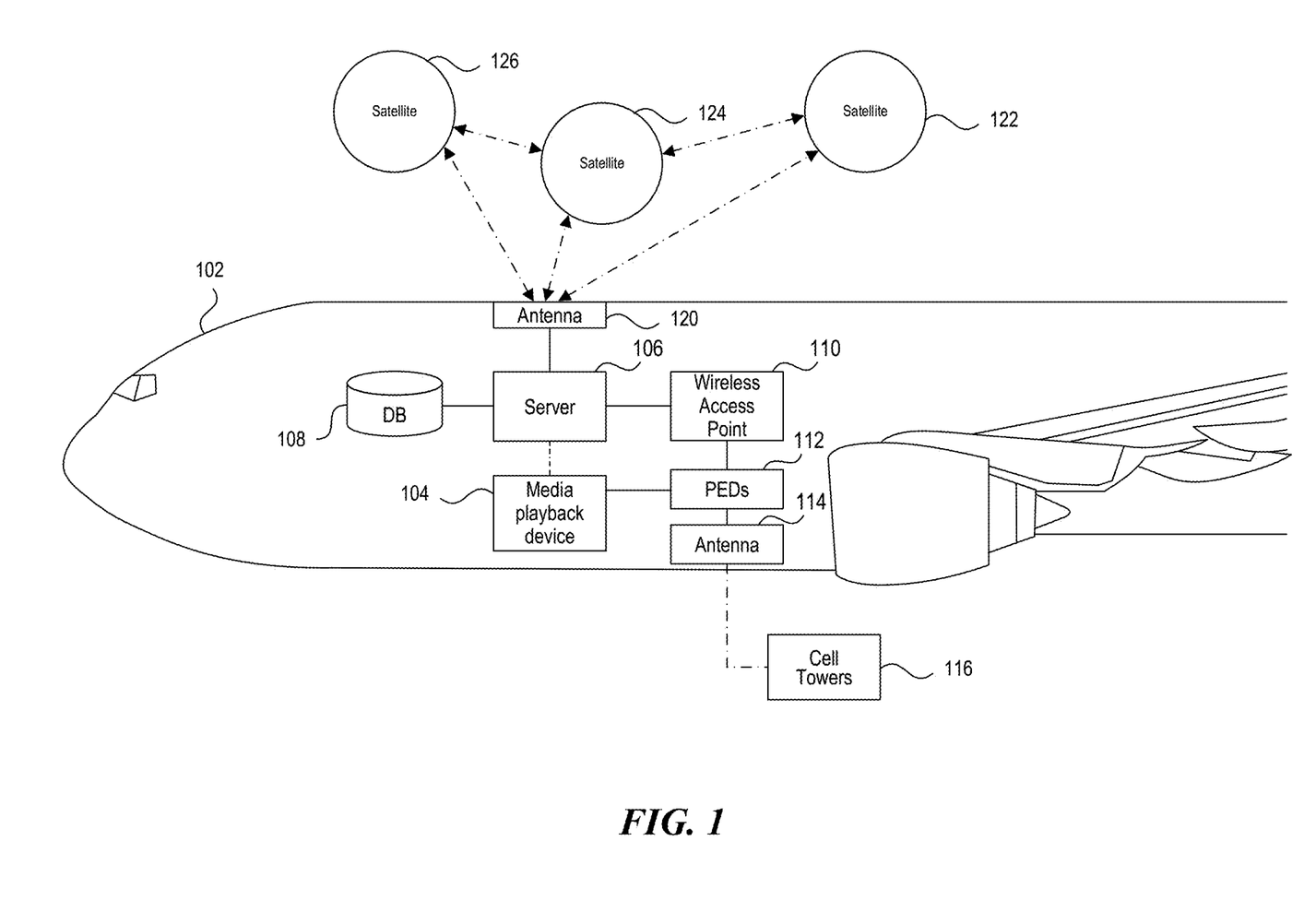
FIG. 1 shows an exemplary in-vehicle system installed in an airplane based on some implementations of the disclosed technology.

FIG. 1 shows an example of an in-flight system for passengers in a commercial passenger vehicle such as an airplane. The example diagram of the in-flight system as shown in FIG. 1 is provided to explain how wireless connections are supported in the airplane 102. The components shown as a single element in FIG. 1, e.g., the server 106, the database 108, the wireless access point 110, etc. can be configured in multiple elements. For example, the in-flight service system can include multiple wireless access points to facilitate or support providing of wireless coverages for the passengers.

The in-flight service system includes a server 106, media playback devices 104, and a PED (personal electronic device) that are located in the airplane 102. Most travelers carry PEDs having wireless communication capability to allow users to access Internet, such as cellular phones, smart phones, tablet computers, laptop computers, and other portable electronic devices. Many of these PEDs have the capability to execute application software programs ("apps") to perform various functions. In some implementations, the media playback devices 104 are provided at each passenger seat, such as located at each of the seatbacks of the passenger seats, and/or on cabin walls and/or deployable from an armrest for seats located at a bulkhead, i.e., in the first row of a section.

The server 106 is communicably coupled with the media playback devices 104 and the PEDs 112. The communication between the server 106 and the onboard devices including the media playback devices 104 and the PEDs 112 is either realized by wired connections or wireless connections. In some implementations, the communication among the server 106, the media playback devices 104, and the PEDs 112 are achieved through the antenna 114 to and from ground-based cell towers 116 by, for example, a provision of network plugs at the seat for plugging PEDs 112 to a wired onboard local area network. In some other implementations, the communications among the server 106, the media playback devices 104, and the PEDs 112 are achieved through the antenna 120 to and from satellites 122, 124, 126 in an orbit, e.g. via a cellular network utilizing one or more onboard base station(s), Wi-Fi utilizing the wireless access point 110, and/or Bluetooth. Thus, the server 106, the media playback devices 104, and the PEDs 112 form a local network aboard the airplane 102 through an on-board router (not shown). In some discussions below, the Wi-Fi and Bluetooth signals may be referred to as radio signals.

Figure 2A:
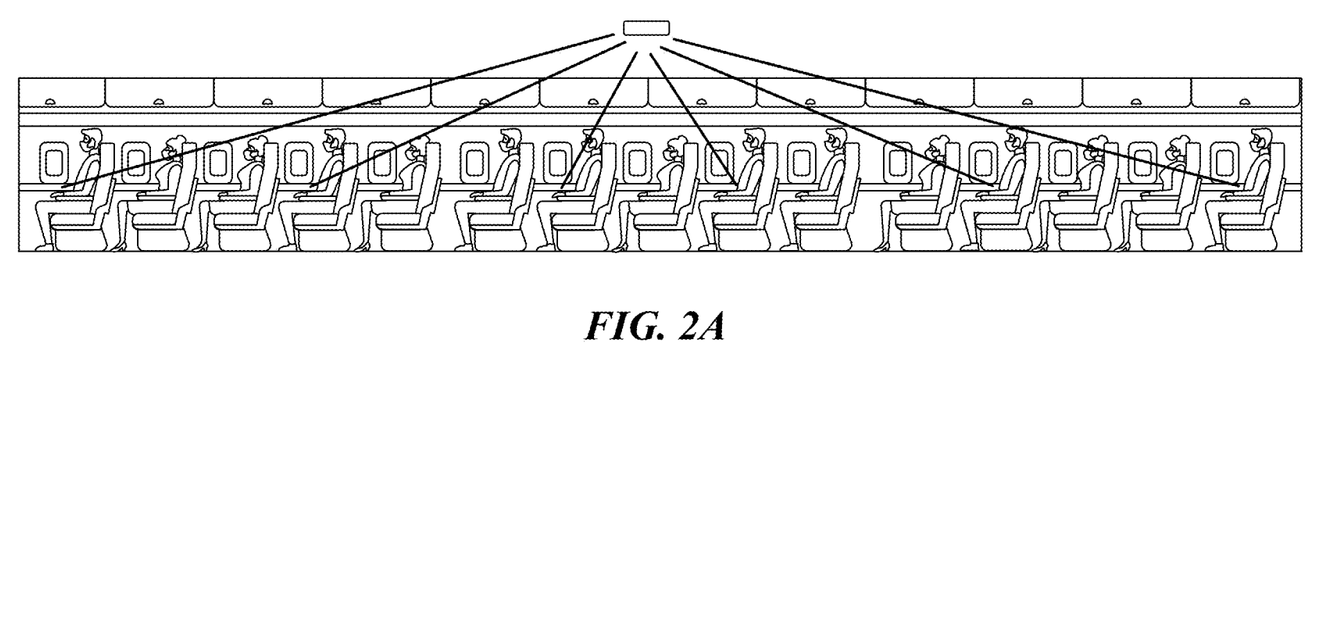
FIG. 2A shows an example view of a conventional access layout in an airplane.
Figure 2B:
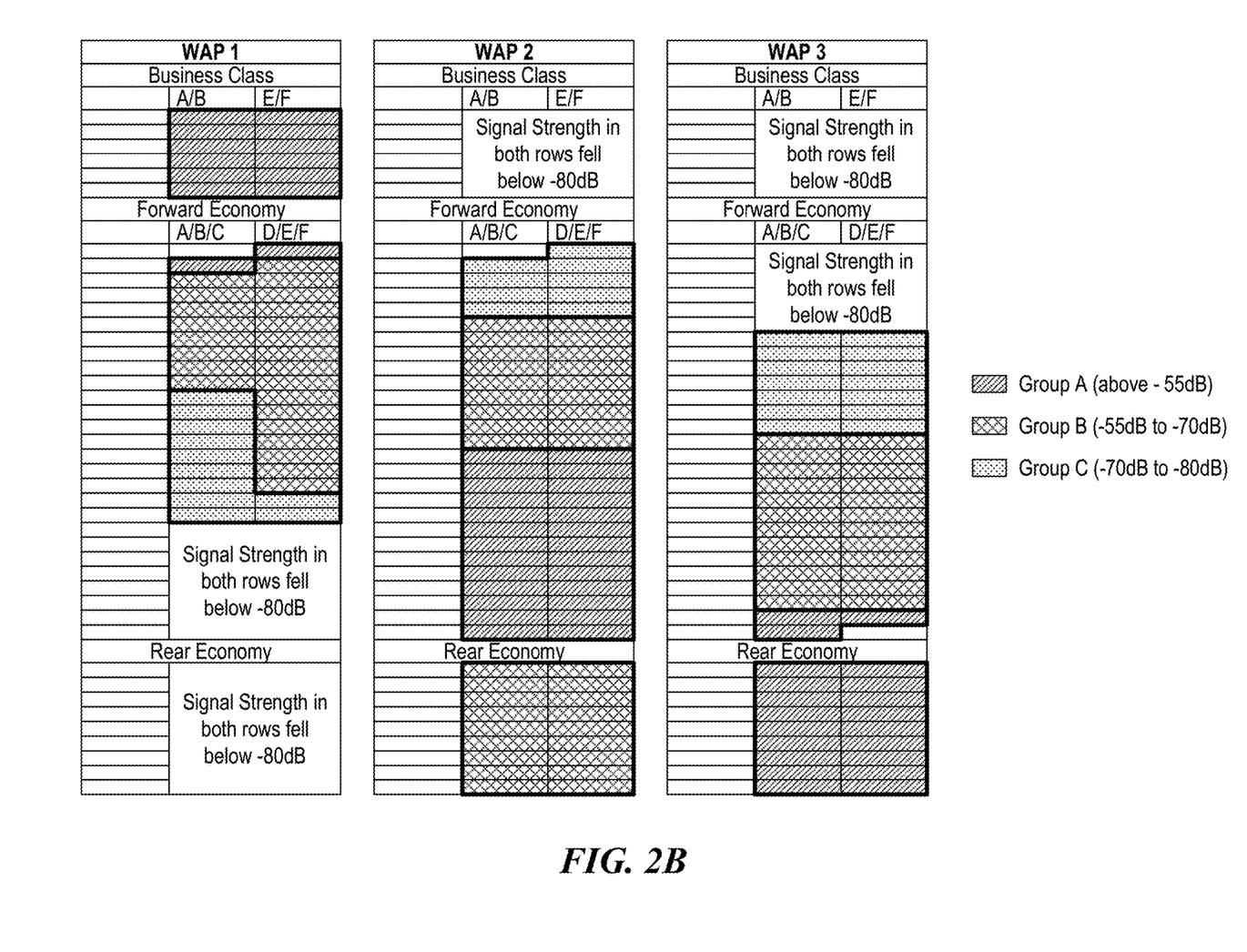
FIG. 2B shows an example of a radio signal strength diagram in the airplane with the conventional access layout.

FIG. 2A shows an example view of a conventional access layout in an airplane and FIG. 2B shows an example of a radio signal strength diagram in the airplane with the conventional access layout. The example view of FIG. 2A shows one wireless access point (WAP) installed in an overhead bin to provide radio signals for passengers located in a certain area of the airplane. Excluding impact from human tissue absorption and blockage due to luggage, most WAPs utilize LOS (line of sight) and minor repropagation to provide adequate coverage. The skin of the fuselage also helps propagate the signal. In the example of FIG. 2B, three wireless access points (WAPs) are shown to provide the media playback devices 104 and the PEDs 112 with access to communication network such as Internet. Each wireless access point provides a wireless access zone as a part of a communication network using radio frequency (RF) transmissions. The passengers on the airplane can be provided with wireless connection services through corresponding wireless access zones in the airplane. To improve passenger experiences in using wireless access services, implementations of the disclosed technology provide creating localized wireless access zones while the wireless access zones can be separated from each other to prevent unnecessary interferences among wireless access zones.

The diagram of FIG. 2B shows that there are only limited slots available on WAP2 and WAP3 for the passengers. Adding an additional WAP4 can be considered to address this issue but such adding of the additional WAP4 can increase the channel overlaps and signal interferences. In addition, while the bold borders in FIG. 2B indicate location of corresponding WAPs, the diagram of FIG. 2B shows that radio signals from each WAP transmits pretty far and covers a relatively wide area. For example, radio signals from the WAP1, which is located at the seat No. 4, reach to the seat No. 43 and radio signals from the WAP2 and WAP3, which are located near the seat No. 28 and the seat No. 37, respectively, reach to Seat No. 1, although the signal strengths are low at some areas. Having a relatively wide coverage area of each WAP can aggregate the channel overlaps and signal interference issues. To address the above issues and improve passenger experiences in terms of wireless connection services, some implementations of the disclosed technology suggest providing a localized wireless access zone to enable a localized control of wireless connections.

Figure 3:
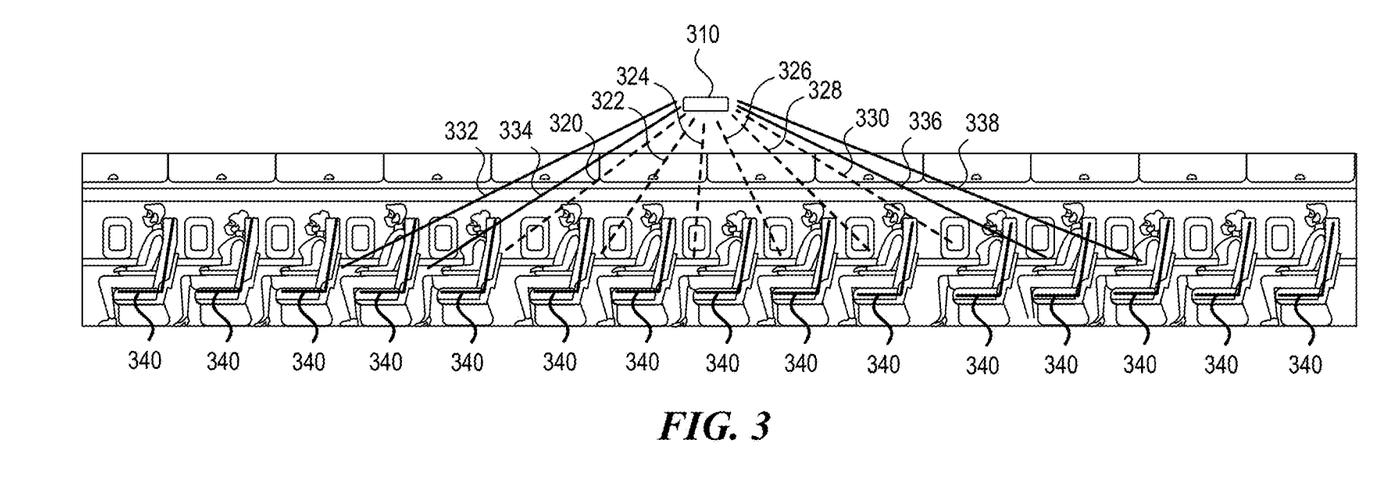
FIG. 3 shows an example view of a localized access zone based on some implementations of the disclosed technology.

FIG. 3 shows an example view of a localized access zone based on some implementations of the disclosed technology. As compared to the view as shown in FIG. 2A in which the WAP provides the radio signals transmitted to 15 passengers, the WAP 310 in FIG. 3 provides a localized access zone covering a smaller area. The radio signals can include Wi-Fi signals. The views in FIGS. 2A and 3 are provided to facilitate the understanding of the localized access zone that has less overlapping areas of other access zones and the numbers of the passengers covered by the wireless access zones are not limited to those shown in FIGS. 2A and 3. When radio signals are transmitted from the WAP 310, some of the radio signals, which are beyond a line of sight (LoS), are attenuated by the radio frequency (RF) shielding structure 340. As compared to the in-flight system as shown in FIG. 2A in which no RF shielding structure is provided, the in-flight system with the RF shielding structure 340 allows the WAP 310 to cover a smaller area, which makes it possible to localize wireless access zones on the airplane. Each localized wireless access zone is configured to cover the reduced number of passengers as compared to the in-flight system without the RF shielding structure and thus passengers can be provided with wireless connectivity with better connection qualities. Since the WAP 310 covers a relatively smaller area as compared to the conventional one, it is possible for the WAP 310 to reduce power consumptions and transmissions.

In FIG. 3, the RF shielding structures 340 are provided on passenger seats of the airplane. For example, the RF shielding structures 340 are disposed inside of the seats or on the seats as covers of the seats. The RF shielding structure 340 includes RF shielding material configured to reduce or prevent propagations of electromagnetic radiations such as radio signals transmitted from WAPs. The RF shielding material has a property to absorb magnetic and radio waves. In some implementations, the RF shielding material is fire-resistant and water-proof. In some implementations, a metal such as copper, aluminum, steel-based materials can be used as the RF shielding material. In some implementations, the RF shielding structure 340 is provided as a combination of highly conductive metals with fabric. In some implementations, the RF shielding material can be selected in consideration of its weight. For example, the RF shielding material can have 80 to 90 grams/square meter, which is not limited there. In some implementations, the thickness of the RF shielding structures can be varied depending on the amount of RF shielding.

The RF shielding structures 340 can be designed in various manners to provide localized wireless access zones in the airplane. The RF shielding structure can be implemented in various shapes. For example, in some embodiments, a mesh structure may be used. The mesh may be embedded into seat cushion or a body of the seatback. The mesh structure may provide an advantage that it will be lighter compared to a solid structure while at the same time providing similar level of RF attenuation. In some cases, the size of openings of the mesh may be dependent on the frequency band of wireless transmissions that are to be attenuated. For example, the mesh opening may be designed to be smaller than 1/L times the typical wavelength to be suppressed, where L is an integer between 8 and 12. In some embodiments, the RF shielding structure may be a frame that is embedded and contoured to fit the seatback. The RF shielding structure may provide dual function of rigid support to the seat and at the same time attenuate certain RF frequencies. In some cases, a solid structure that is disposed along contours of the seat may be used to implement the RF shielding structure. Whether to use a mesh structure or a solid structure may be decided based upon a tradeoff between additional weight and effectivity of attenuation of RF signals. For example, in some embodiments, a solid RF shield may be used in fewer locations (e.g., separation walls between cabin types) while the mesh RF shield may be used in consecutive seatback. Other implementations are also possible for the RF shielding structure 340 as long as the RF shielding structure can reduce or prevent propagation of electromagnetic radiation. In the example of FIG. 3A, the RF shielding structure 340 is provided in each passenger seat. However, it is also possible that the RF shielding structure 340 is provided in some of the passenger seats only, while the remaining passenger seats are provided without the RF shielding structure.

In FIG. 3, the passenger seats provided with RF shielding structures 340 are arranged at different locations in the airplane. Depending on the locations of the RF shielding structures 340 relative to the WAP 310, some radio signals are attenuated to be below a predetermined threshold in a certain access zone, thereby providing a localized access zone. For example, in FIG. 3, the radio signals 332, 334, 336, 338 are blocked by the RF shielding structures 340 while the radio signals 320, 322, 324, 326, 328, 330 are not blocked. When a radio signal is blocked by a corresponding RF shielding structure, it may refer to a case that the radio signal is attenuated to be below a threshold. Since the RF shielding structures 340 have a characteristic to absorb radio signals, when the radio signal reaching to the RF shielding structure 340 has a strength below the threshold, the RF shielding structure can operate as a blockage for transmitting the radio signal to a corresponding passenger. Various simulations and analysis can be performed using software tools to determine how to arrange the RF shielding structures 340 in the airplane in consideration of the number of localized wireless zones provided in the airplane and the number of passengers supported by the single WAP. In one example, the single WAP supports 35-50 passengers which are less than 100-135 passengers supported by the single WAP in the conventional airplane without the RF shielding structures (see FIG. 2A).

Figure 4:
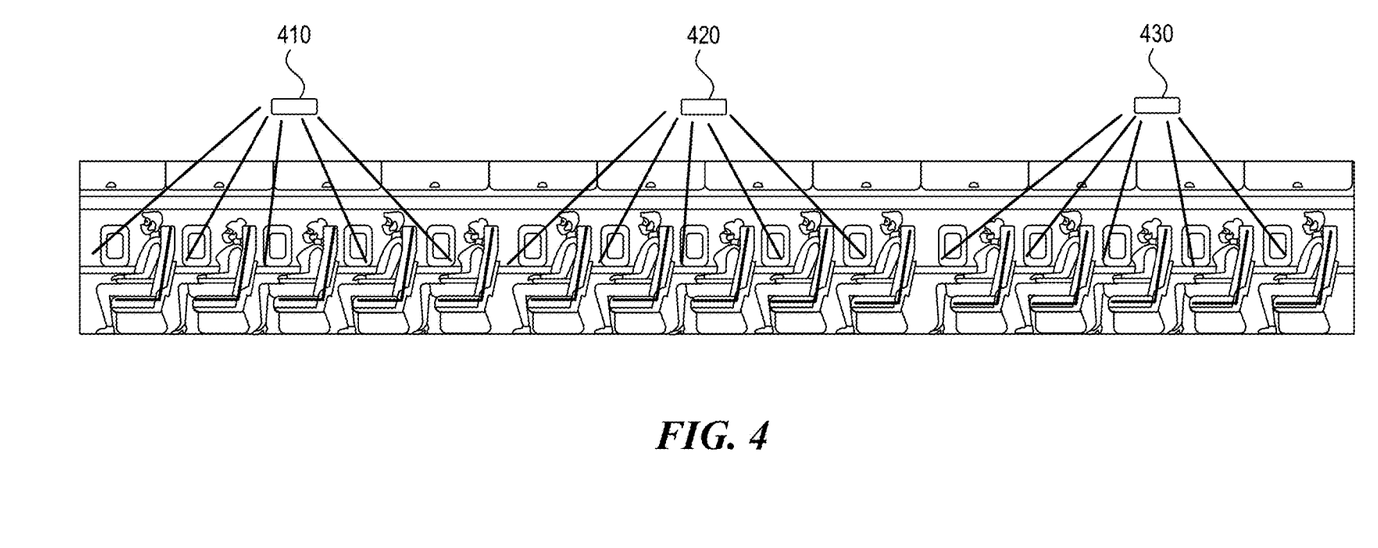
FIG. 4 shows another example view of localized access zones based on some implementations of the disclosed technology.

FIG. 4 shows another example view of localized access zones based on some implementations of the disclosed technology. In FIG. 4, three WAPs 410, 420, 430 are installed in overhead bins to provide wireless accesses for passengers, each WAP 410, 420, 430 creating a corresponding localized wireless zone.

In addition to creating the localized wireless zone, the RF shielding structures 440 on can provide zone segregations, which can prevent and reduce channel overlapping and signal interferences among wireless access zones. The first wireless access zone created by the first WAP 410 can be separated from the second wireless access zone created by the second WAP 420 since the radio signals from the first WAP 410 are blocked and thus cannot be transmitted to the second wireless access zone and the radio signals from the second WAP 420 are blocked and thus cannot be transmitted to the first wireless access zone. Similarly, the second wireless access zone created by the second WAP 420 can be separated from the third wireless access zone created by the third WAP 430.

Figure 5A:
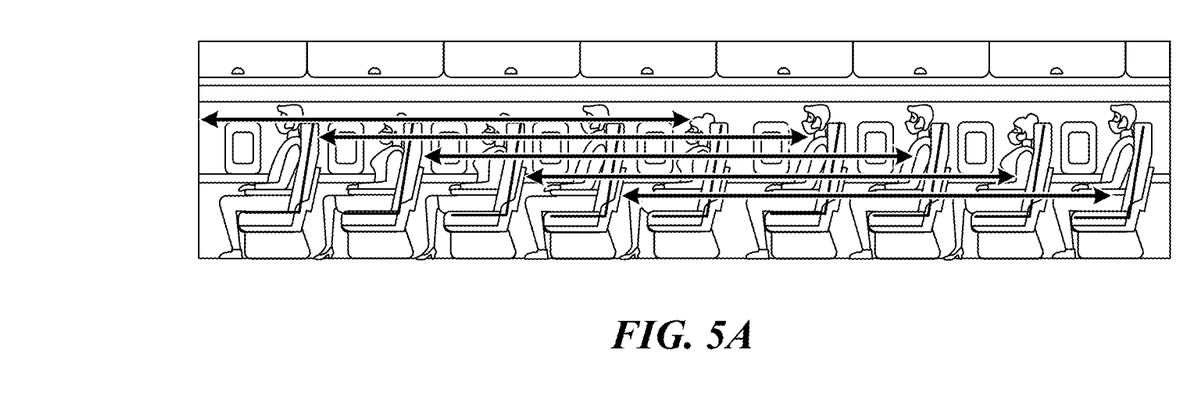
FIG. 5A shows an example view of conventional access zones supporting Bluetooth connections.
Figure 5B:
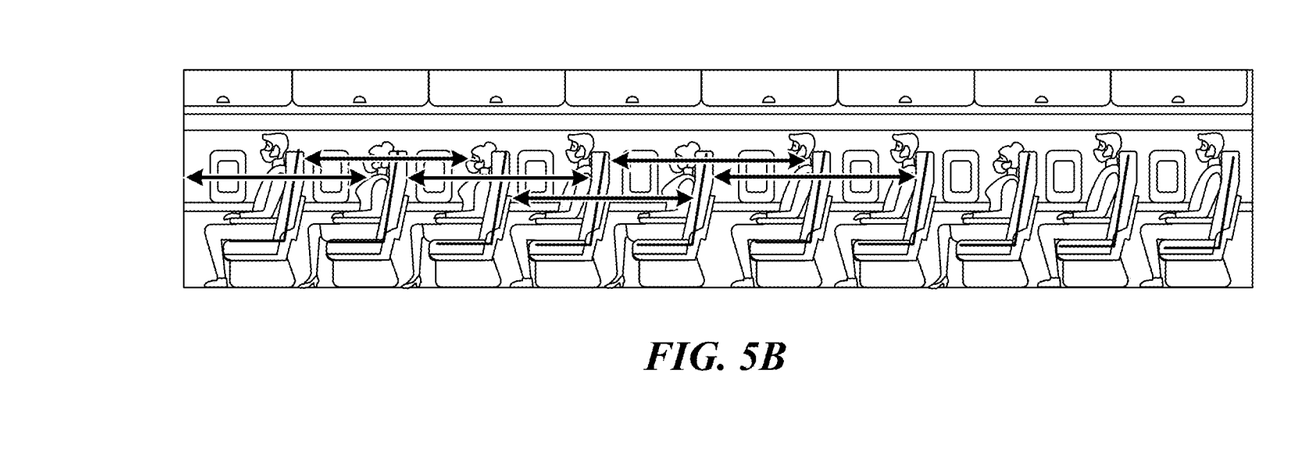
FIG. 5B shows an example view of a localized access zone supporting Bluetooth connections.

FIG. 5A shows an example view of conventional access zones supporting radio signals such as Bluetooth connections and FIG. 5B shows an example view of a localized access zone supporting radio signals such as Bluetooth connections. The Bluetooth signals have a low bandwidth than those of Wi-Fi signals and the localized access zone supporting for the Bluetooth signals can be provided based on some implementations of the disclosed technology.

In FIG. 5A, a conventional access zone, which is provided in the airplane without RF shielding structures, covers a relatively wider area that reaches relatively longer distance both forward and backward with respect to a specific passenger in the airplane, which causes unnecessary signal interferences and channel congestions. In the example of FIG. 5A in which 9 passengers are shown, each access zone created by the PED or the media playback device of each passenger extends to correspond to five passenger seats including two front passenger seats located in front of a specific passenger seat and two rear seats located behind the specific passenger seat. In this case, the signal interferences and channel congestions are strongest in the circled area, e.g., around third to fifth passenger seats, which can cause unsatisfying travel experiences for some passengers in the airplane.

In FIG. 5B, the localized access zones are provided in the airplane with the RF shielding structures that are configured to reduce the range of propagation of the radio signals. As discussed above in relation to FIGS. 3 and 4, the RF shielding structures include RF shielding material to help block and reduce unwanted radio signals and allow a wireless device to be connected through the closest or assigned radio signal, which provides the localized access zone with the limited range of propagation. In the example of FIG. 5B, each access zone created by the PED or the media playback device of each passenger has a relatively smaller travel distance as compared to the case of FIG. 5A, because the RF shielding structures disposed at some passenger seats operate to block the corresponding radio signals based on the travel distance of the radio signals. This can ensure better passenger experiences by avoiding interference and congestion in using Bluetooth connection services. The RF shielding structures are configured similarly to those as discussed in relation to FIGS. 3 and 4.

Although the examples of the wireless access zone support for different types of radio signals, e.g., Wi-Fi signals and Bluetooth signals, the single wireless access zone can be created to support different types of radio signals. For example, the local access zone is created to allow the different types of radio signals to be present in the local access zone.

Figure 6:
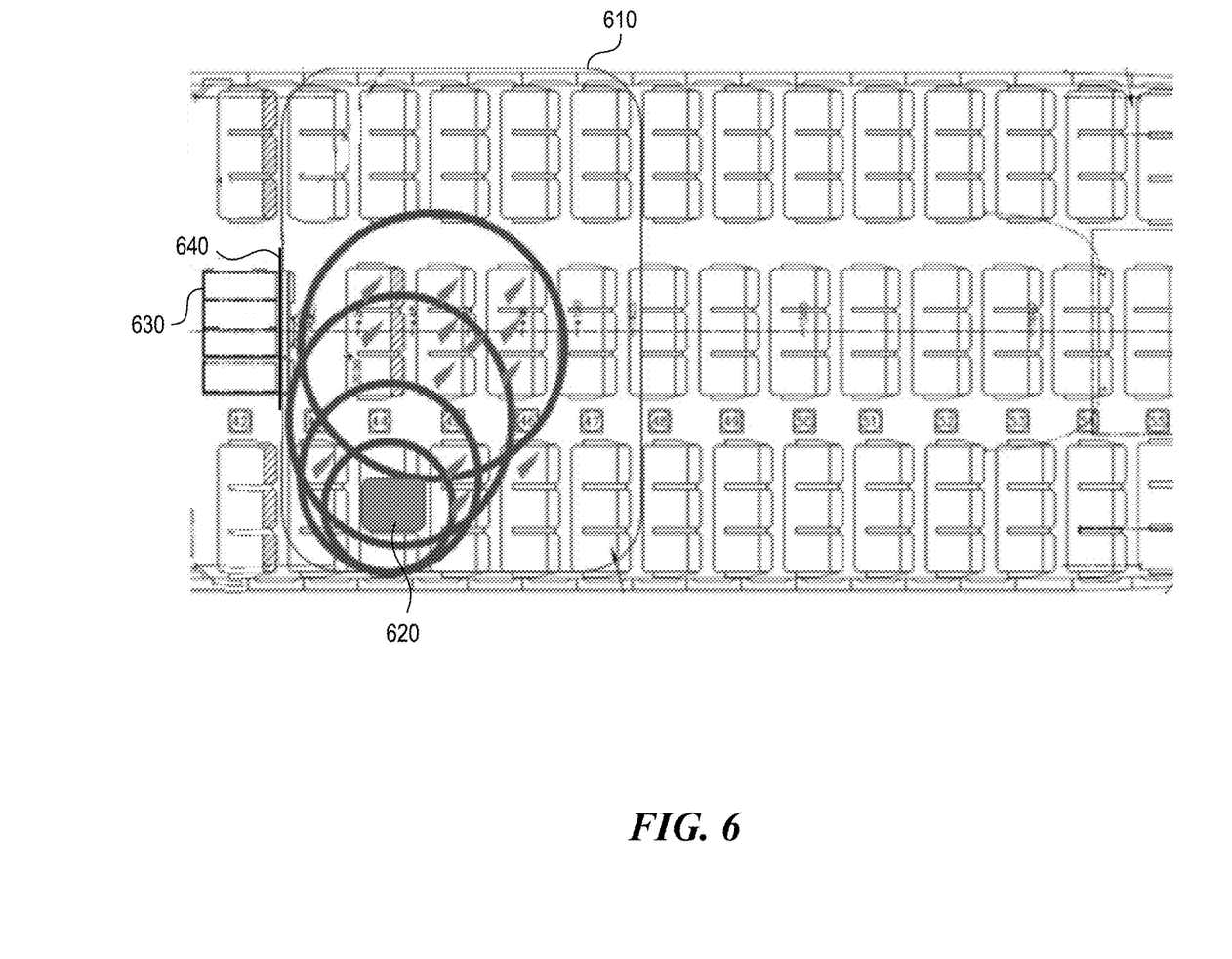
FIG. 6 shows an example of a local isolation zone based on some implementations of the disclosed technology.

FIG. 6 shows an example of a local isolation zone based on some implementations of the disclosed technology.

In the example, a localized isolated zone 610 is created using RF shielding structures. There exist possible sources of reflections of radio signals such as the cabin equipment 630 and the wall 640. The localized isolated zone 610 can be provided as an isolation region in the airplane in which the signal overlapping and interferences are reduced. To create the localize isolated zone, the strengths of the radio signals transmitted at least some passenger seats are monitored and a test operation is performed at a certain position (e.g., the location 620 in the example of FIG. 6). In some examples, the test operations can be performed to measure the strengths of the radio signals in a certain area (e.g., the circled areas in the example of FIG. 6). Based on the results of the test operation, the position of the localized isolated zone 610 is determined. For example, the localized isolated zone 610 is located in an area where high wireless usage is anticipated. The localized isolated zone 610 can be implemented by mounting the RF shielding structures as discussed above. The RF shielding structure can be arranged on every seat in the localized isolated zone 610 or only some of the seats in the localized isolated zone 610. The location and the size of the localized isolated zone 610 and the number of RF shielding structures provided in the localized isolated zone 610 can be varied in various manners depending on the need for the localized isolated zone 610, the size of an airplane, and others.

Although the RF shielding structures are disposed on passenger seats in an airplane, various implementations can be made. For example, the RF shielding structure can be provided as a separate element without being disposed on a passenger seat. For example, the RF shielding structure is provided as curtains and provide the separation between the areas located front and back of the curtains. In some implementations, the RF shielding structures are disposed on both passenger seats and as curtain in the airplane. Although the implementations discussed above describe the airplane as the example of a commercial passenger vehicle, the RF shielding structures can be employed in other types of the commercial passenger vehicle such as a train, a ship, or a bus. In some other implementations, the RF shielding structure can be employed in various locations such as restaurants, airport lounges, conference halls, meeting rooms, etc., without being limited to the commercial passenger vehicle.

Figure 7:
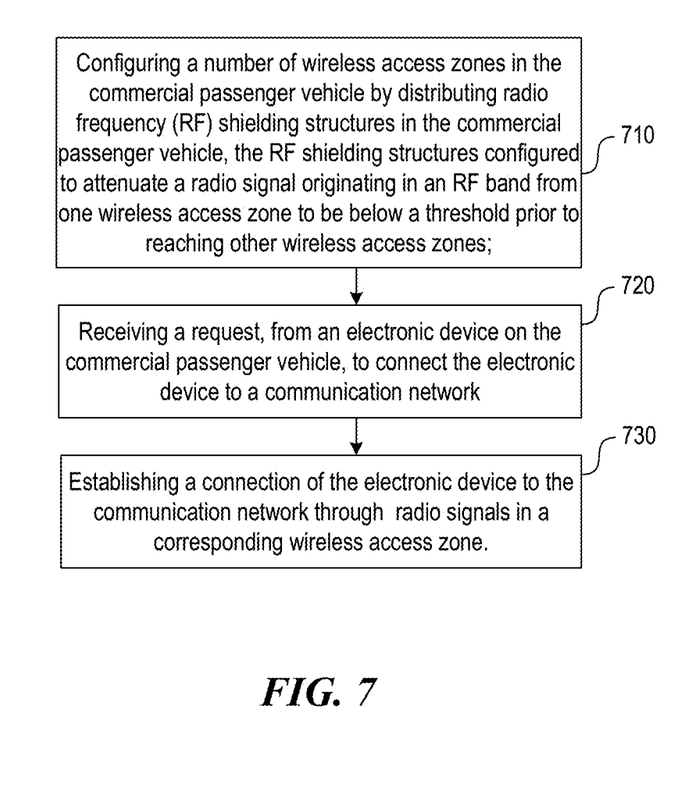
FIG. 7 shows an example flowchart of operations of providing a wireless access zone to passengers on a commercial passenger vehicle.

FIG. 7 shows an example of a method for providing a wireless access zone to passengers on a commercial passenger vehicle.

At the operation 710, a number of wireless access zones in the commercial passenger vehicle are configured by distributing radio frequency (RF) shielding structures in the commercial passenger vehicle. In the example, the RF shielding structures are configured to attenuate a radio signal originating in an RF band from one wireless access zone to be below a threshold prior to reaching other wireless access zones. At the operation 720, a request is received from an electronic device on the commercial passenger vehicle, to connect the electronic device to a communication network. At the operation 730, a connection of the electronic device to the communication network is established through radio signals in a corresponding wireless access zone.

In some implementations, the radio signals are transmitted from a wireless access point installed in the commercial passenger vehicle. In some implementations, the radio signals are transmitted between the electronic device and another electronic device located in the commercial passenger vehicle and the wireless access zone is defined based on a distance between the electronic device and the another electronic device. In some implementations, the one or more RF shielding structures are disposed on passenger seats in the commercial passenger vehicle. In some implementations, the one or more RF shielding structures are provided as curtains in the commercial passenger vehicle. In some implementations, each of the one or more RF shielding structures includes a material having a property to absorb some radio signals. In some implementations, each of the one or more RF shielding structures includes a metal. In some implementations, the wireless access zone is defined at a location in the commercial passenger vehicle based on a wireless usage on the commercial passenger vehicle, the wireless access zone being isolated from a remaining area of the airplane.

Figure 8:
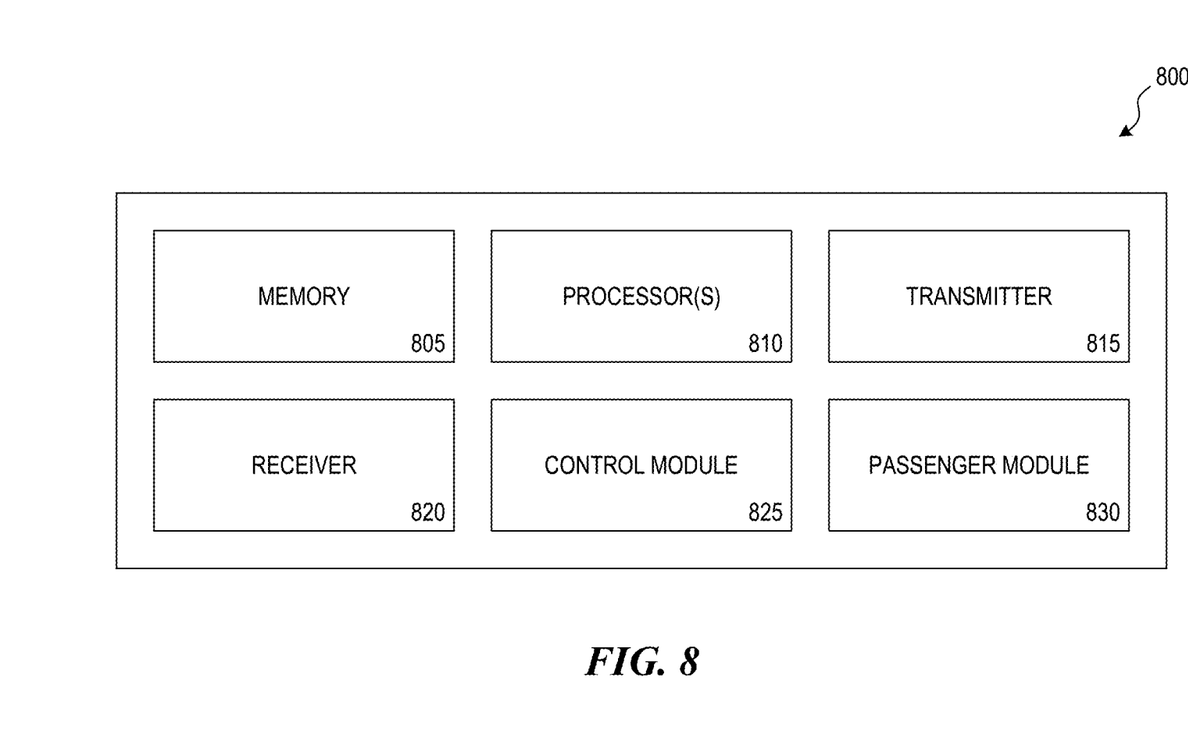
FIG. 8 shows an example of a block diagram of an in-flight server based on some implementations of the disclosed technology.

FIG. 8 shows an example block diagram of a server that is a part of an example of the in-flight service system. The server 800 includes at least one processor 810, a memory 805, a transmitter 815, a receiver 820, a control module 830, or a passenger module 840. In other embodiments, additional, fewer, and/or different elements may be used to configure the server 800. The memory 805 may store instructions to be executed by the processor 810. The memory 805 is an electronic holding place or storage for information or instructions so that the information or instructions can be accessed by the processor 810. The memory 805 can include, but is not limited to, any type of random access memory (RAM), any type of read only memory (ROM), any type of flash memory, etc., such as magnetic storage devices (e.g., hard disk, floppy disk, magnetic strips, etc.), optical disks (e.g., compact disk (CD), digital versatile discs (DVD), etc.), smart cards, flash memory devices, etc. The instructions upon execution by the processor 810 configure the server 800 to perform the operations (e.g., the operations as shown in FIG. 7) which will be described in this patent document. The instructions executed by the processor 810 may be carried out by a special purpose computer, logic circuits, or hardware circuits. The processor 810 may be implemented in hardware, firmware, software, or any combination thereof. The term "execution" is, for example, the process of running an application or the carrying out of the operation called for by an instruction. The instructions may be written using one or more programming language, scripting language, assembly language, etc. By executing the instruction, the processor 810 can perform the operations called for by that instruction.

The processor 810 operably couples with the memory 805, transmitter, 815, the receiver, 820, the control module 830, and the passenger module 840, etc. to receive, to send, and to process information and to control the operations of the server 200. The processor 810 may retrieve a set of instructions from a permanent memory device such as a ROM device and copy the instructions in an executable form to a temporary memory device that is generally some form of RAM. In some implementations, the server 800 can include a plurality of processors that use the same or a different processing technology. The transmitter 815 transmits or sends information or data to another device (e.g., another server, media playback devices 104, or PEDs 112). The receiver 820 receives information or data transmitted or sent by another device (e.g., another server, media playback devices 104, or PEDs 112).

The control module 820 of the server 200 is configured to perform operations to assist the in-vehicle communication system. In some implementations, the control module can be configured as a part of the processor 810 and can perform an analysis and/or testing for wireless access zones provided in the commercial passenger vehicle. Although FIG. 8 shows the control module 820 as included in the in-vehicle server, in some implementations, the control module 820 can operate as a separate element from the in-vehicle server and work with a ground server (not shown) to facilitate the operations for providing wireless access zones. In some implementations, the control module 820 can operate a machine learning/artificial intelligence (AI) applications that perform various types of data analysis to automate analytical model building. Using algorithms that iteratively learn from data, machine learning applications can enable computers to learn without being explicitly programmed. The machine learning/AI module may be configured to use data learning algorithms to build models to interpret various data received from the various devices or components to detect, classify, and/or predict future outcomes. Such data learning algorithms may be associated with rule learning, artificial neural networks, inductive logic programming, and/or clustering. In some implementations, the control mode 820 may assist the server 200 to perceive their environment and take actions that maximize the effectiveness of wireless access zones provided in the commercial passenger vehicle.

The machine learning/AI applications may compile coded descriptions into lower-level structured data objects that a machine can more readily understand, build a network topology of the main problem concept and sub-concepts covering aspects of the problem to be solved, train codified instantiations of the sub-concepts and main concept, and execute a trained AI model containing one, two, or more neural networks. The machine learning/AI applications can abstract away and automate the low-level mechanics of AI, and the machine learning/AI module can manage and automate much of the lower level complexities of working with AI. Each program developed in a pedagogical programming language can be fed into the control module in order to generate and train appropriate intelligence models. The machine learning/AI applications can be a cloud-hosted platform configured to manage complexities inherent to training AI networks. Thus, the machine learning/AI module can be accessible with one or more client-side interfaces to allow third parties to submit a description of a problem in a pedagogical programming language and let the online AI engine build and generate a trained intelligence model for one or more of the third parties. In some embodiments, the machine learning/artificial intelligence applications employs algorithms to determine, based on various information, at least one of the number of localized isolated zones provided in the commercial passenger vehicle, the predetermined threshold of radio signal attenuations, the location and the size of the localized wireless access zone(s), the arrangements of RF shielding structures, etc.

The passenger module 230 of the server 200 is configured to obtain information on passengers which can be utilized to provide the services for the passengers. The passenger information can be obtained in multiple manners and stored in the passenger module 230. The passenger information can be obtained by the airlines and/or by a third-party prior to boarding of a corresponding passenger.

It will be appreciated that the present document provides techniques that may be used by various embodiments to provide wireless access zones in a commercial passenger vehicle. In a commercial passenger vehicle, although passengers are physically demarked from each other based on seat number, row number, type of cabin (e.g., economy or business), and so on, in general no such demarcation is possible for wireless signals emanating from different seat locations and propagating inside the commercial passenger vehicle. It will be appreciated that embodiments may be able to provide such demarcations using wireless access zones such that a device that is inside an access zone is permitted to connect with a corresponding access point and another device that is outside the access zone is not permitted to connect with the access point. Furthermore, advantageously, RF shielding structures may be used to achieve such demarcations by signal attenuations resulting in a wireless access zone mapping that matches physical layout of the commercial passenger vehicle. For example, a wireless access zone may be defined to match N seat rows and M adjoining seats (e.g., N=1 or 2, M=3, etc.). Similarly, wireless access zones may be designed to be separated based on aisle gaps, and so on.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

What is claimed is:

1. A method of providing a wireless access zone on a commercial passenger vehicle, the method comprising:
    configuring a number of wireless access zones in the commercial passenger vehicle by distributing radio frequency (RF) shielding structures in the commercial passenger vehicle, the RF shielding structures configured to attenuate a radio signal originating in an RF band from one wireless access zone to be below a threshold prior to reaching other wireless access zones;
    receiving a request, from an electronic device on the commercial passenger vehicle, to connect the electronic device to a communication network; and
    establishing a connection of the electronic device to the communication network through radio signals in a corresponding wireless access zone,
    wherein the RF shielding structures have a mesh structure that is embedded in passenger seats in the commercial passenger vehicle.

2. The method of claim 1, wherein the radio signals are transmitted from a wireless access point installed in the commercial passenger vehicle.

3. The method of claim 1, wherein the radio signals are transmitted between the electronic device and another electronic device located in the commercial passenger vehicle and the wireless access zone is defined based on a distance between the electronic device and the another electronic device.

4. The method of claim 1, wherein the RF shielding structures are disposed inside of passenger seats or provided as covers of the passenger seats in the commercial passenger vehicle.

5. The method of claim 1, wherein the RF shielding structures include additional RF shielding structures that are provided as curtains in the commercial passenger vehicle.

6. The method of claim 1, wherein each of the RF shielding structures includes a material having a property to absorb at least some radio signals.

7. The method of claim 1, wherein each of the RF shielding structures includes a metal.

8. The method of claim 1, wherein the wireless access zone is defined at a location in the commercial passenger vehicle based on a wireless usage on the commercial passenger vehicle, the wireless access zone being isolated from a remaining area of the commercial passenger vehicle.

9. An in-vehicle communication system for providing a wireless access zone to passengers on a commercial passenger vehicle, the system comprising:
    a wireless access point installed in the commercial passenger vehicle and transmitting radio signals that support a wireless connection for electronic devices associated with passengers in the commercial passenger vehicle; and
    radio frequency (RF) shielding structures disposed in the commercial passenger vehicle and configured to allow first radio signals to be present in a wireless access zone and block second radio signals in the wireless access zone based on locations of the RF shielding structures,
    wherein the RF shielding structures have a mesh structure that is embedded in passenger seats in the commercial passenger vehicle.

10. The in-vehicle communication system of claim 9, wherein the RF shielding structures are disposed inside of passenger seats or provided as covers of the passenger seats in the commercial passenger vehicle.

11. The in-vehicle communication system of claim 9, wherein the RF shielding structures include additional RF shielding structures that are provided as curtains in the commercial passenger vehicle.

12. The in-vehicle communication system of claim 9, wherein each of the RF shielding structures includes a material having a property to absorb the second radio signals.

13. The in-vehicle communication system of claim 9, wherein the wireless access zone is defined at a location in the commercial passenger vehicle based on a wireless usage on the commercial passenger vehicle, the wireless access zone being isolated from another area of the commercial passenger vehicle.

14. The in-vehicle communication system of claim 9, wherein the RF shielding structures are further configured to allow third radio signals to be present in the wireless access zone and block fourth radio signals in the wireless access zone, the third radio signals having a different bandwidth from first radio signals.

15. An in-vehicle communication system, comprising:
    radio frequency (RF) shielding structures disposed in a commercial passenger vehicle; and
    RF zones formed by a presence of the RF shielding structures,
    wherein the RF shielding structures are configured such that an RF signal originating in an RF band from one RF zone is attenuated below a threshold prior to reaching other RF zones, thereby providing RF isolation among the RF zones, and wherein the RF shielding structures have a mesh structure that is embedded in passenger seats in the commercial passenger vehicle.

16. The in-vehicle communication system of claim 15, wherein the RF shielding structures are disposed inside of passenger seats or provided as covers of the passenger seats in the commercial passenger vehicle.

17. The in-vehicle communication system of claim 15, wherein the RF shielding structures include additional RF shielding structures that are provided as curtains in the commercial passenger vehicle.

18. The in-vehicle communication system of claim 15, wherein each of the RF shielding structures includes a material having a property to absorb the RF signal.

19. The in-vehicle communication system of claim 15, wherein the RF zones are defined at locations in the commercial passenger vehicle based on a wireless usage on the commercial passenger vehicle.

20. The in-vehicle communication system of claim 15, further comprising a server configured to apply an algorithm that determines a number of RF zones and a size of the RF zones.

* * * * *